United States Patent
Kumar et al.

(10) Patent No.: US 10,686,363 B2
(45) Date of Patent: Jun. 16, 2020

(54) PRIMARY SIDE NO LOAD DETECTION AND SHUTDOWN CIRCUIT IN AN ISOLATED DRIVER

(71) Applicants: Nitin Kumar, Beverly, MA (US); Markus Ziegler, Watertown, MA (US)

(72) Inventors: Nitin Kumar, Beverly, MA (US); Markus Ziegler, Watertown, MA (US)

(73) Assignee: OSRAM SYLVANIA Inc., Wilmington, MA (US)

( * ) Notice: Subject to any disclaimer, the term of this patent is extended or adjusted under 35 U.S.C. 154(b) by 653 days.

(21) Appl. No.: 14/312,951

(22) Filed: Jun. 24, 2014

(65) Prior Publication Data
US 2015/0043246 A1  Feb. 12, 2015

Related U.S. Application Data

(60) Provisional application No. 61/864,319, filed on Aug. 9, 2013.

(51) Int. Cl.
| | |
|---|---|
| *H02M 1/32* | (2007.01) |
| *H02M 1/36* | (2007.01) |
| *H02M 3/337* | (2006.01) |
| *H05B 45/50* | (2020.01) |
| *H02M 1/00* | (2006.01) |

(52) U.S. Cl.
CPC ............ *H02M 1/32* (2013.01); *H02M 1/36* (2013.01); *H02M 3/3376* (2013.01); *H05B 45/50* (2020.01); *H02M 2001/0058* (2013.01); *Y02B 20/348* (2013.01); *Y02B 70/1491* (2013.01)

(58) Field of Classification Search
CPC ...... H02M 1/32; H02M 3/33515; H05B 37/02
See application file for complete search history.

(56) References Cited

U.S. PATENT DOCUMENTS

| | | | | |
|---|---|---|---|---|
| 5,747,942 A | * | 5/1998 | Ranganath | H05B 41/282 315/209 R |
| 5,854,538 A | * | 12/1998 | Krummel | H05B 41/295 315/105 |
| 5,883,473 A | * | 3/1999 | Li | H05B 41/2855 315/209 R |
| 6,037,722 A | * | 3/2000 | Moisin | H05B 41/28 315/224 |
| 2005/0190583 A1 | * | 9/2005 | Morimoto | H02M 1/34 363/24 |
| 2007/0145956 A1 | * | 6/2007 | Takeuchi | H02M 1/4225 323/207 |
| 2010/0327765 A1 | | 12/2010 | Melanson et al. | |
| 2011/0109230 A1 | | 5/2011 | Simi | |
| 2011/0227493 A1 | | 9/2011 | Du et al. | |

FOREIGN PATENT DOCUMENTS

CN           101505568 A      8/2009

* cited by examiner

*Primary Examiner* — Daniel Kessie
(74) *Attorney, Agent, or Firm* — Shaun P. Montana

(57) ABSTRACT

A no load detection and shutdown circuit in an isolated driver is provided. A no load condition is detected by primary side evaluation of a reflected voltage. If a determination is made that a no load condition is present, the no load detection circuit signals a half bridge driver of the driver to cease oscillations, shutting down the driver.

20 Claims, 5 Drawing Sheets

PRIMARY SIDE NO LOAD DETECTION AND SHUTDOWN CIRCUIT IN AN ISOLATED DRIVER

CROSS-REFERENCE TO RELATED APPLICATION

The present application claims priority of U.S. Provisional Patent Application No. 61/864,319, entitled "DRIVER FOR SOLID STATE LIGHT SOURCES", filed on Aug. 9, 2013, the entire contents of which are hereby incorporated by reference.

TECHNICAL FIELD

The present invention relates to lighting, and more specifically, to drivers for solid state light sources.

BACKGROUND

Solid state light sources, such as but not limited to light emitting diodes (LEDs) and other semiconductor-based light sources, require a constant direct current (DC) voltage or current to operate optimally. During operation, the light source must be protected from line-voltage fluctuations. Changes in voltage can produce a disproportional change in current, which in turn can cause light output to vary, as solid state light source light output is proportional to current and is rated for a current range. If current exceeds the manufacturer recommendations, the output of the solid state light sources can become brighter, but that output can degrade at a faster rate due to higher temperatures within the device, which leads to a shorter useful life.

Solid state light sources, therefore, require a driver (also referred to as a driver circuit and/or a power supply) that converts incoming alternating current (AC) power to the proper DC voltage, and regulates the current flowing through the light sources during operation. The driver converts 120V (or other voltages) 60 Hz AC power to DC power required by the light sources, and protects the light sources from line-voltage fluctuations.

SUMMARY

In certain driver configurations, the output voltage under a no load condition in an open loop (feedback disabled) will exceed the maximum Class 2 UL limit of 60 volts to the resonant circuit's open circuit voltage. To limit this voltage, the driver needs to shut down safely under this condition. Embodiments provide a no load detection and shutdown circuit on the primary side of a driver that evaluates a reflected voltage without requiring an additional optocoupler in the event of a no load condition.

In an embodiment, there is provided a no-load detection and shutdown circuit. The no-load detection and shutdown circuit includes a circuit having an input capable of being placed in mechanical and electrical communication with a primary side of a driver and an output capable of being placed in mechanical and electrical communication with a half-bridge inverter of the driver, wherein the circuit is configured to detect a no load condition at an output of the driver, and in response, to provide a signal at the output to shut down the driver.

In a related embodiment, the circuit may include: a first capacitor having a first lead connected to the input; a second capacitor having a first lead connected to a second lead of the first capacitor and a second lead connected to a ground; a first Zener diode having an anode connected to the first lead of the second capacitor and to a second lead of the first capacitor, the first Zener diode having a cathode; a second Zener diode having a cathode connected to the cathode of the first Zener diode, the second Zener diode having an anode; a first resistor having a first lead connected to the anode of the second Zener diode; a second resistor having a first lead connected to the anode of the second Zener diode and connected to the first lead of the first resistor, the second resistor having a second lead connected to the ground; and a third Zener diode having an anode connected to the second lead of the first resistor, the second Zener diode having a cathode connected to the output of the circuit. In a further related embodiment, a no-load condition may result in an increased voltage at the first capacitor and the second capacitor; the increased voltage at the first and second capacitor may break down the first Zener diode and the second Zener diode; and an increased voltage at the second Zener diode may cause the third Zener diode to breakdown and may provide a signal at the output of the no-load detection and shutdown circuit indicating a no-load condition has occurred, the signal at the output of the no-load detection and shutdown circuit causing the driver to shutdown.

In another related embodiment, the circuit may be configured to detect a no load condition at an output of the driver, and in response, the driver may be configured to generate a driver output voltage greater than a predetermined voltage. In a further related embodiment, the driver output voltage greater than a predetermined voltage may include a driver output voltage greater than sixty volts.

In another embodiment, there is provided an apparatus. The apparatus includes: a driver having an input configured to receive an alternating current (AC) voltage and an output configured to provide a direct current (DC) voltage to drive a load; and a no load detection circuit coupled to the driver, wherein the no load detection circuit is configured to detect a no load condition at the output of the driver and, in response, is configured to provide a signal to the driver causing the driver to shut down.

In a related embodiment, the driver may include: an EMI front end coupled to a first AC line, a second AC line, and a neutral line, the EMI front end configured to provide a rectified DC voltage; a boost PFC circuit coupled to the EMI front end, the boost PFC configured to provide a boosted voltage; an inverter coupled to the boost PFC circuit; an HB driver coupled to the inverter; an isolation transformer having a primary side coupled to the inverter and a secondary side; a rectifier coupled to the secondary side of the isolation transformer; and an output filter coupled to the rectifier, an output of the output filter capable of driving a load. In a further related embodiment, the no load detection circuit may include: an input comprising a first capacitor having a first lead connected to the primary side of the isolation transformer; a second capacitor having a first lead connected to a second lead of the first capacitor and a second lead connected to a ground; a first Zener diode having an anode connected to the first lead of the second capacitor and connected to a second lead of the first capacitor, the first Zener diode having a cathode; a second Zener diode having a cathode connected to the cathode of the first Zener diode, the second Zener diode having an anode; a first resistor having a first lead connected to the anode of the second Zener diode; a second resistor having a first lead connected to the anode of the second Zener diode and connected to the first lead of the first resistor, the second resistor having a second lead connected to the ground; and a third Zener diode having an anode connected to the second lead of the first resistor, wherein the second Zener diode has a cathode connected to the HB driver. In a further related embodiment, a no-load condition may be reflected on the isolation transformer and to the no load detection circuit, the no load detection circuit may be configured to provide an output indicating the no load condition, the HB driver may be configured to receive the output indicating the no load condition and in response, may be configured to shut down the driver.

In another related embodiment, the no-load detection circuit may be configured to detect a no load condition at the output of the driver and, in response, the driver may be configured to output a driver voltage greater than a predetermined voltage. In a further related embodiment, a driver voltage greater than a predetermined voltage may include a driver voltage greater than sixty volts. In another further related embodiment, a no-load condition may result in an increased voltage at the first capacitor and the second capacitor, the increased voltage at the first and second capacitor may break down the first Zener diode and the second Zener diode, and an increased voltage at the second Zener diode may cause the third Zener diode to breakdown and provide a signal at the output of the no-load detection circuit indicating a no-load condition has occurred, the signal at the output of the no-load detection circuit causing the driver to shutdown.

In another embodiment, there is provided a method. The method includes: detecting a no-load condition on an output of a driver; in response, generating a shutdown signal by a no load detection circuit; providing the shutdown signal to the driver; and in response, shutting down the driver.

In a related embodiment, detecting a no-load condition may include detecting a driver output voltage greater than a predetermined voltage. In a further related embodiment, detecting a driver output voltage may include detecting a driver output voltage greater than sixty volts. In a further related embodiment, providing the shutdown signal to the driver may include providing a signal to an HB driver of the driver. In a further related embodiment, providing a signal to the HB driver may result in half bridge inverter oscillations being stopped.

In another related embodiment, generating a shutdown signal may include: receiving an increased voltage at an input of the no load detection circuit; and determining the increased voltage is large enough to shut down the driver.

BRIEF DESCRIPTION OF THE DRAWINGS

The foregoing and other objects, features and advantages disclosed herein will be apparent from the following description of particular embodiments disclosed herein, as illustrated in the accompanying drawings in which like reference characters refer to the same parts throughout the different views. The drawings are not necessarily to scale, emphasis instead being placed upon illustrating the principles disclosed herein.

DETAILED DESCRIPTION

Figure 1:
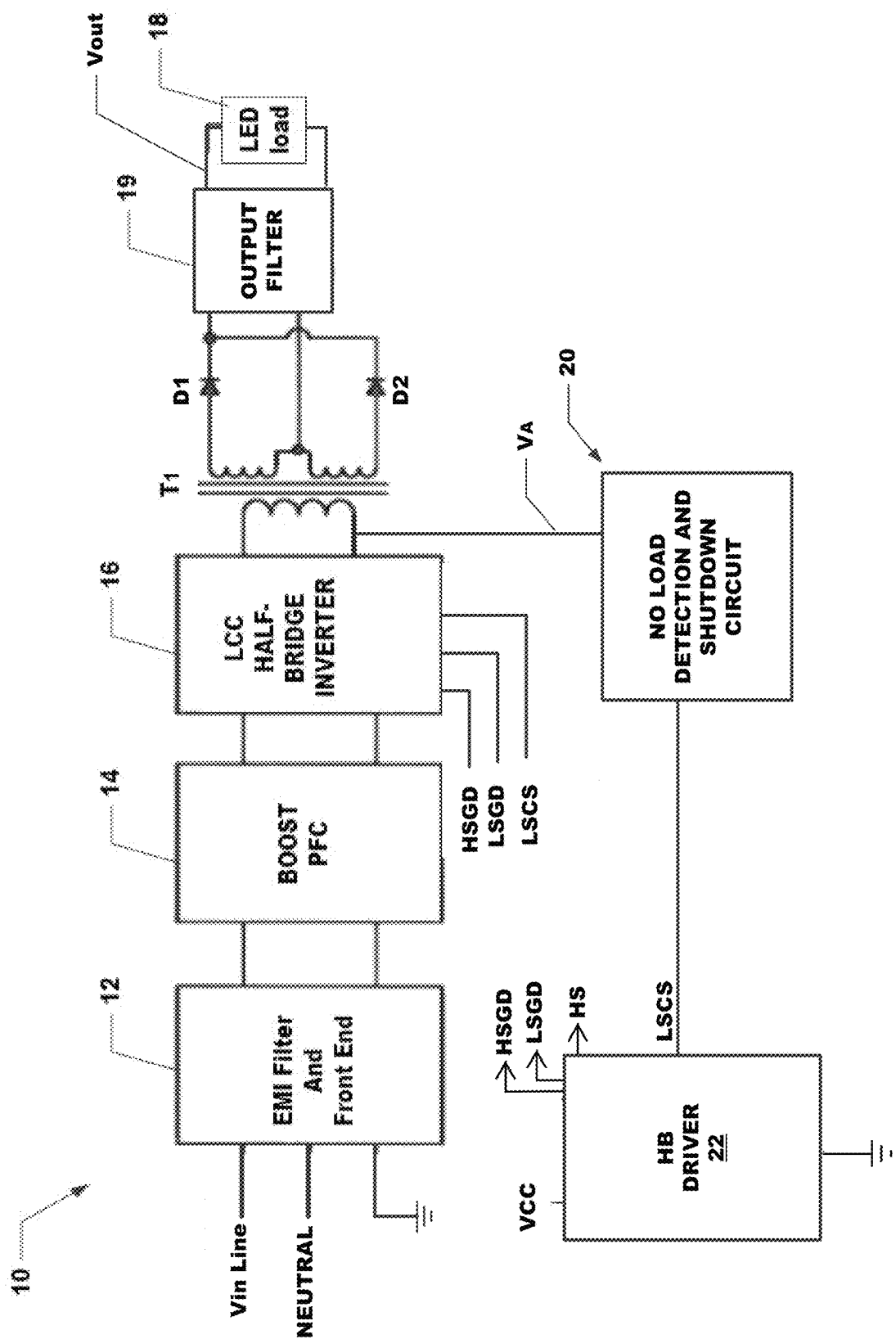
FIG. 1 shows a schematic diagram of a primary side no load detection and shutdown circuit in an isolated driver according to embodiments disclosed herein.

FIG. 1 shows a primary side no load detection and shutdown circuit 20 in an isolated driver 10. An alternating current (AC) voltage Vin Line along with a neutral line NEUTRAL is provided to an EMI front end 12, which provides a rectified direct current (DC) voltage at an output. This rectified DC voltage is provided to a boost PFC circuit 14, which outputs a boosted voltage (e.g., 450 volts). This boosted voltage is fed into an LCC half bridge inverter 16, which includes a resonant network with an LCC tank circuit (not shown in FIG. 1). The output of the LCC half bridge inverter 16 is then provided to a primary side of an isolation transformer $T_1$. The isolation transformer $T_1$ is used for isolation, and in some embodiments, could provide a step up voltage, a step down voltage, and/or reflect the input voltage at the same level.

A secondary side of the isolation transformer $T_1$ is followed by a rectifier comprising a diode $D_1$ and a diode $D_2$, which is followed by an output filter 19. Current from the output filter 19 is then provided to an LED load 18, which in some embodiments includes one or more light emitting diodes, and in some embodiments includes one or more solid state light sources (such as but not limited to light emitting diodes, organic light emitting diodes, polymer light emitting diodes, organic light emitting compounds, and/or combinations thereof). All of the above-described circuitry is driven by an HB driver 22, which is used to set the current to a certain value and sets the output voltage to a certain value. The HB driver 22 provides a gate drive for the boost PFC circuit 14 and a gate drive for the LCC half bridge inverter 16. The HB driver 22 also provides additional functionality, such as but not limited to circuit protections. Under normal loaded operation, the output voltage is always within the UL Class 2 Lighting Power Supply limit of 60V.

The driver 10 also includes a no load detection and shutdown circuit 20. The no load detection and shutdown circuit 20 has an input connected to a primary side of the isolation transformer $T_1$. When a no load condition occurs, the no load detection and shutdown circuit 20 detects a high voltage on the primary side of the isolation transformer $T_1$ and forces the driver 10 to shut down by injecting voltage on an LSCS pin of the HB driver 22, exceeding its fault shutdown threshold voltage. When the threshold voltage on this pin is reached, it causes a safe shutdown, as oscillations of the LCC half bridge inverter are stopped and there is no more output voltage. Under normal loaded operation, no interference is present. This is possible with any HB driver that has a fault shutdown threshold voltage, which is usually connected to a current sense resistor of the half bridge.

A no load situation where the threshold may be exceeded can occur under several different scenarios. For example, a no load condition occurs when the LED load 18 is removed from the output of the driver 10. The no load condition may also be caused by a fault in the interconnect of the LED load 18 to the driver 10 or when the LED load 18 is broken or otherwise malfunctions. When a predetermined threshold voltage is exceeded at the output of the driver 10 (e.g., the UL Class 2 limit of 60V), the driver 10, by way of the no load detection and shutdown circuit 20, will shut down.

Additionally, there may be an occurrence of a voltage spike, which may not have enough duration to shut down the driver 10 without the use of the no load and detection circuit 20, therefore a fast detection scheme is required.

Figure 2:
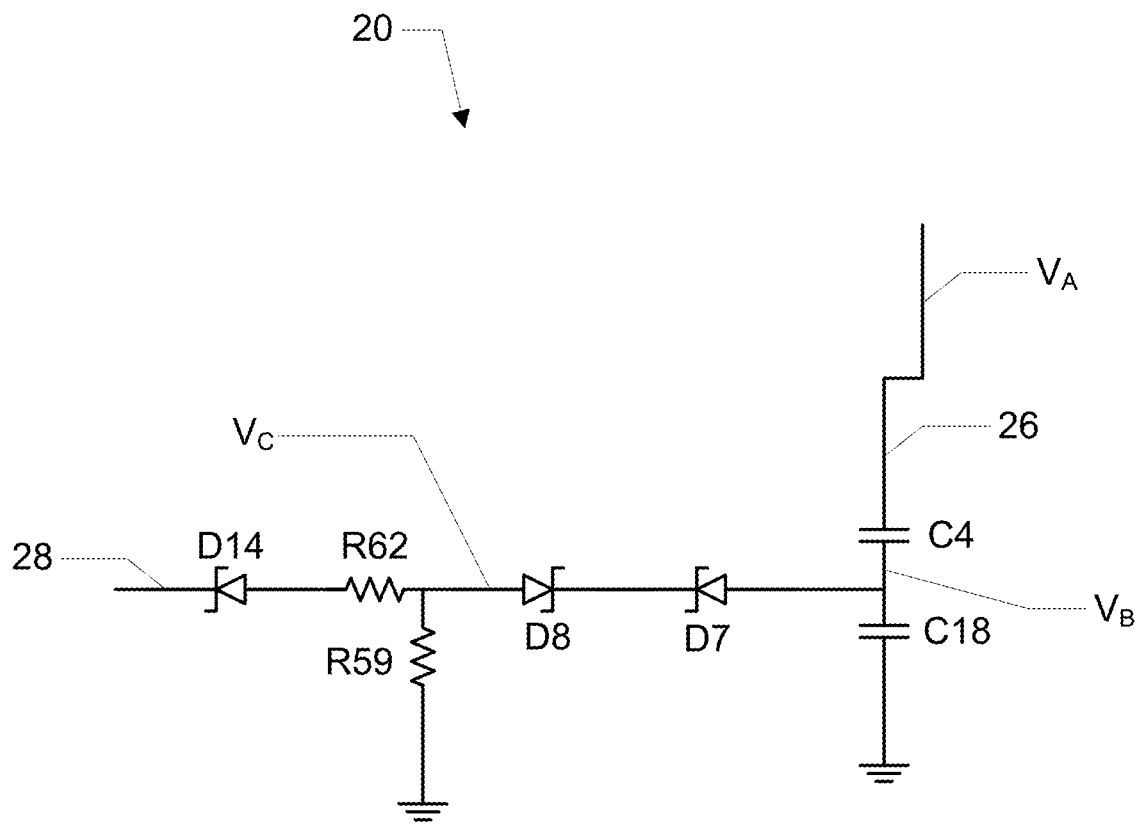
FIG. 2 depicts a schematic diagram of a primary side no load detection and shutdown circuit according to embodiments disclosed herein.

FIG. 2 shows an embodiment of the no load detection and shutdown circuit 20 of FIG. 1. The no load detection and shutdown circuit 20 includes an input 26 and an output 28. The input 26 is connected to a first lead of a first capacitor C4. The input 26 is also coupled to the primary side of the isolation transformer $T_1$ (not shown in FIG. 2, but shown in FIG. 1). A second capacitor C18 has a first lead connected to a second lead of the first capacitor C4 and a second lead connected to a ground. A first Zener diode D7 has an anode connected to the first lead of the second capacitor C18 and to the second lead of the first capacitor C4. A second Zener diode D8 has a cathode connected to a cathode of the first Zener diode D7. A first resistor R62 has a first lead connected to an anode of the second Zener diode D8. A second resistor R59 has a first lead connected to the anode of the second Zener diode and to the first lead of the first resistor R62, and a second lead connected to ground. A third Zener diode D14 has an anode connected to the second lead of the first resistor R62, and has a cathode connected to the output 28. The output 28 is connected to an LSCS pin of the HB driver 22 (shown in FIG. 1).

Under normal operation, a voltage $V_A$ at the input 26 is within an acceptable threshold limit and therefore does not indicate a no load condition. The voltage $V_A$ passes through the first capacitor C4 and is seen as a voltage $V_B$, which is not enough to break down the first Zener diode D7 and the second Zener diode D8, therefore the output 28 does not indicate that the driver 10 needs to be shut down, so normal operation continues. In the event of a no load situation, the voltages $V_A$ and $V_B$ are pumped up very high. This high voltage breaks down the first Zener diode D7 and the second Zener diode D8. A voltage $V_C$ after the second Zener diode D8 is high enough to breakdown the third Zener diode D14, and to provide a signal at the output 28, which forces the driver 10 to shut down by injecting voltage on the LSCS pin of the HB driver 22, exceeding its fault shutdown threshold voltage. When the threshold voltage on the LSCS pin of the BH driver 22 is reached, it causes a safe shutdown as the oscillations of the LCC half bridge inverter 16 are stopped and there is no more output voltage to the LED load 18.

Figure 3:
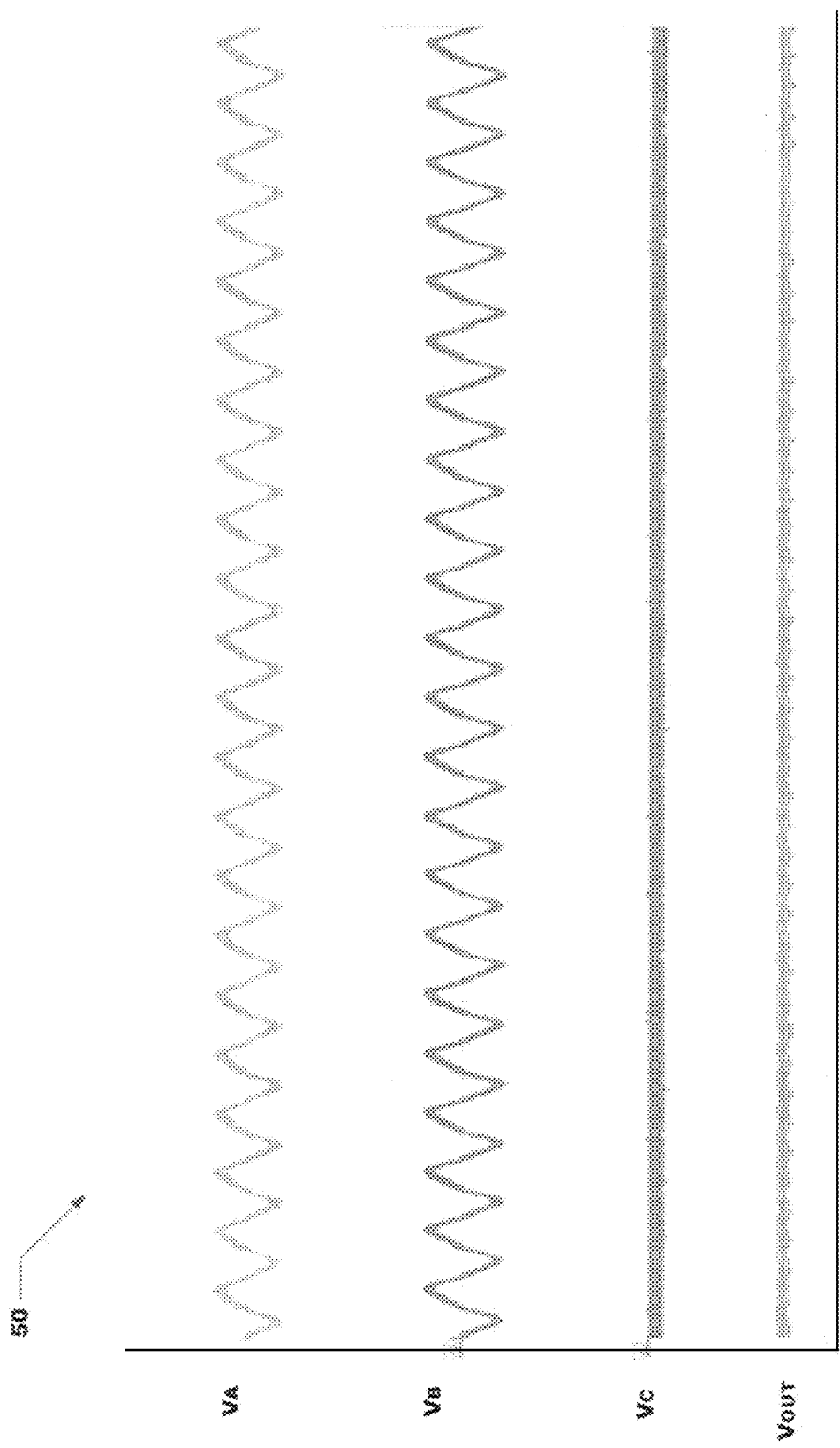
FIG. 3 depicts a first graph of voltages at various parts of the circuit of FIG. 1 in steady state operating conditions according to embodiments disclosed herein.

FIG. 3 is a graph 50 showing the voltages at various locations in the no load detection and shutdown circuit 20. Under normal operating conditions, the voltage $V_A$ is shown as a repeating AC voltage, as is the voltage $V_B$. The voltage $V_C$ is a steady voltage that is not enough to breakdown the third Zener diode D14 of the no load detection and shutdown circuit 20. The output voltage of the no load detection and shutdown circuit 20 $V_{OUT}$ is in steady state and drives the HB driver 22. Under normal operating conditions, the output 28 of the no load detection and shutdown circuit 20 does not trigger the HB driver 22 to shut down the driver 10.

Figure 4:
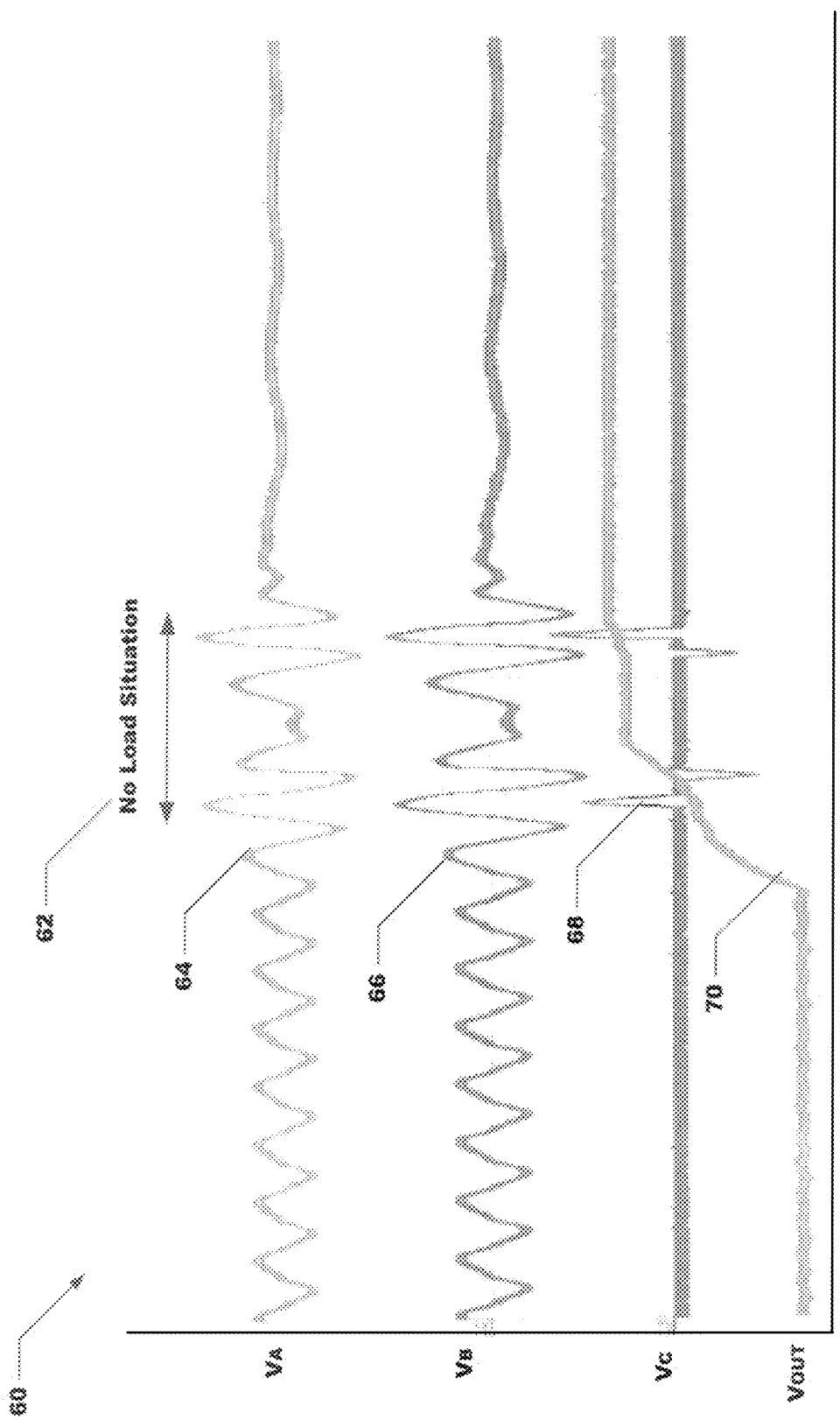
FIG. 4 depicts a second graph of voltages at various parts of the circuit of FIG. 1 in an open load condition according to embodiments disclosed herein.

FIG. 4 is a graph 60 showing the voltages at various locations in the no load detection and shutdown circuit 20. Under normal operating conditions (before the no load situation 62), the voltage $V_A$ is shown as a repeating AC voltage, as is the voltage $V_B$. The voltage $V_C$ is a steady voltage that is not enough to breakdown the third Zener diode D14, and the output voltage $V_{OUT}$ of the no load detection and shutdown circuit 20 is steady state and does not trigger the HB driver 22 to shut down the driver 10. However, when a no load condition 62 arises, this event is reflected as a spike 64 in the voltage $V_A$, which passes through the first capacitor C4 as a voltage spike 66 in the voltage $V_B$. This spike is enough to break down the first Zener diode D7 and the second Zener diode D8, and causes a spike 68 in the voltage $V_C$. This spike causes the third Zener diode D14 to also break down, causing the output voltage $V_{OUT}$ to increase 70. This increase in the output voltage $V_{OUT}$ appears at the LSCS pin of the HD driver 22, and causes the driver 10 to shut down as explained above.

Figure 5:
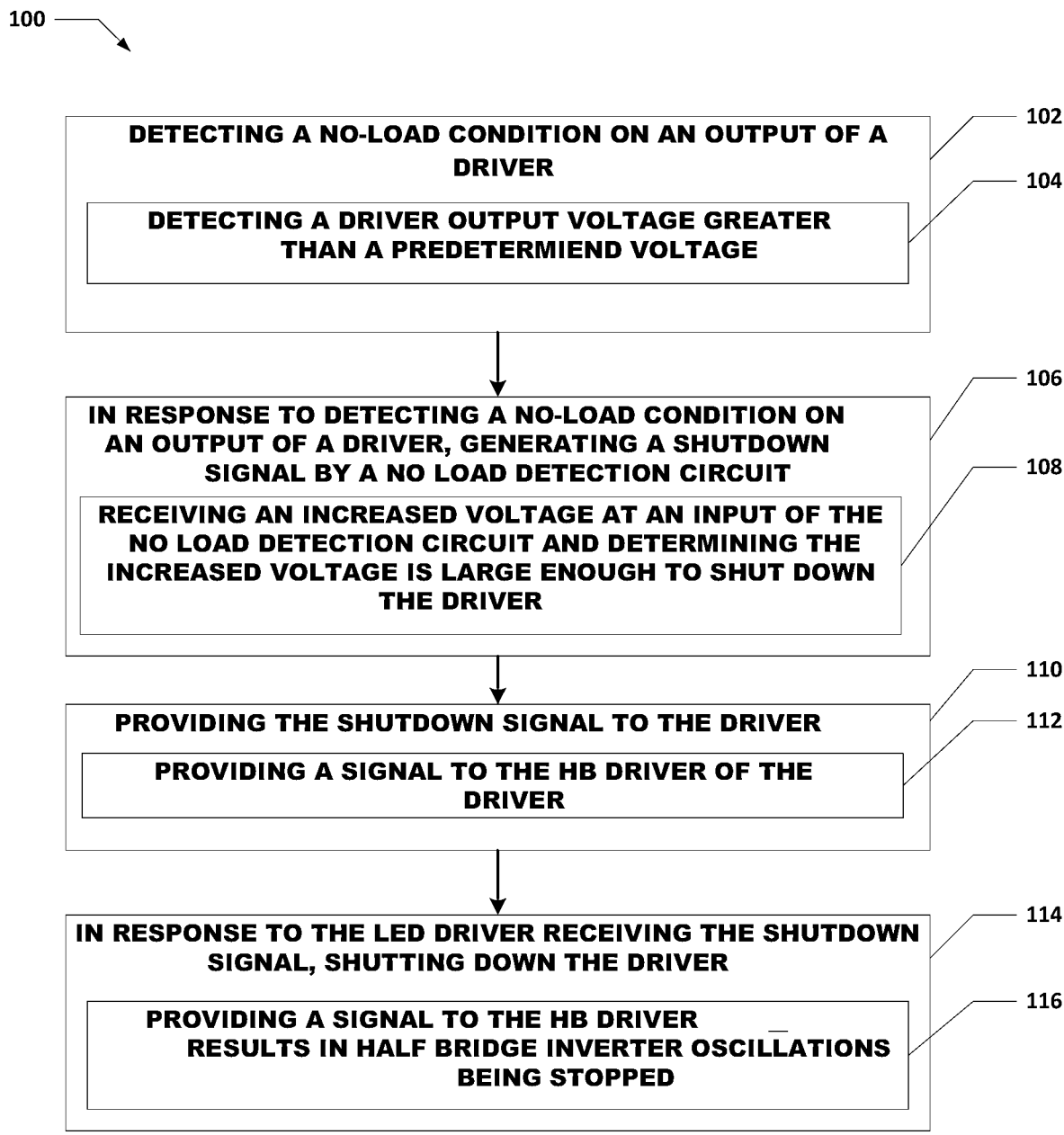
FIG. 5 depicts a flow diagram of a method of providing primary side no load detection and shutdown for a driver according to embodiments disclosed herein.

A flowchart of a method 500 is depicted in FIG. 5. The rectangular elements are herein denoted "processing blocks" and represent computer software instructions or groups of instructions. The diamond shaped elements, are herein denoted "decision blocks," represent computer software instructions, or groups of instructions which affect the execution of the computer software instructions represented by the processing blocks. Alternatively, the processing and decision blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required in accordance with the present invention. It should be noted that many routine program elements, such as initialization of loops and variables and the use of temporary variables, are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

Referring now to FIG. 5, the method 500 for providing no load detection and shutdown for a driver, such as the driver 10 shown in FIG. 1, is shown. Processing begins with processing block 102, which discloses detecting a no-load condition on an output of a driver. As shown in processing block 104, in some embodiments, detecting a no-load condition comprises detecting a driver output voltage greater than a predetermined voltage. In some embodiments, a driver output voltage greater than 60 volts is considered as a no load condition.

Processing block 106 states in response to detecting a no-load condition on an output of a driver, generating a shutdown signal by a no load detection circuit. As shown in processing block 108, generating a shutdown signal comprises receiving an increased voltage at an input of the no load detection circuit, and determining the increased voltage is large enough to shut down the driver.

Processing block 110 recites providing the shutdown signal to the driver. Processing block 112 discloses wherein providing the shutdown signal to the driver comprises providing a signal to the HB driver of the driver. Processing block 116 states providing a signal to the HB driver results in half bridge inverter oscillations being stopped. Processing block 114 discloses in response to the driver receiving the shutdown signal, shutting down the driver.

The methods and systems described herein are not limited to a particular hardware or software configuration, and may find applicability in many computing or processing environments. The methods and systems may be implemented in hardware or software, or a combination of hardware and software. The methods and systems may be implemented in one or more computer programs, where a computer program may be understood to include one or more processor executable instructions. The computer program(s) may execute on one or more programmable processors, and may be stored on one or more storage medium readable by the processor (including volatile and non-volatile memory and/or storage elements), one or more input devices, and/or one or more output devices. The processor thus may access one or more input devices to obtain input data, and may access one or more output devices to communicate output data. The input and/or output devices may include one or more of the following: Random Access Memory (RAM), Redundant Array of Independent Disks (RAID), floppy drive, CD, DVD, magnetic disk, internal hard drive, external hard drive, memory stick, or other storage device capable of being accessed by a processor as provided herein, where such aforementioned examples are not exhaustive, and are for illustration and not limitation.

The computer program(s) may be implemented using one or more high level procedural or object-oriented programming languages to communicate with a computer system; however, the program(s) may be implemented in assembly or machine language, if desired. The language may be compiled or interpreted.

As provided herein, the processor(s) may thus be embedded in one or more devices that may be operated independently or together in a networked environment, where the network may include, for example, a Local Area Network (LAN), wide area network (WAN), and/or may include an intranet and/or the internet and/or another network. The network(s) may be wired or wireless or a combination thereof and may use one or more communications protocols to facilitate communications between the different processors. The processors may be configured for distributed processing and may utilize, in some embodiments, a client-server model as needed. Accordingly, the methods and systems may utilize multiple processors and/or processor devices, and the processor instructions may be divided amongst such single- or multiple-processor/devices.

The device(s) or computer systems that integrate with the processor(s) may include, for example, a personal computer(s), workstation(s) (e.g., Sun, HP), personal digital assistant(s) (PDA(s)), handheld device(s) such as cellular telephone(s) or smart cellphone(s), laptop(s), handheld computer(s), or another device(s) capable of being integrated with a processor(s) that may operate as provided herein. Accordingly, the devices provided herein are not exhaustive and are provided for illustration and not limitation.

References to "a microprocessor" and "a processor", or "the microprocessor" and "the processor," may be understood to include one or more microprocessors that may communicate in a stand-alone and/or a distributed environment(s), and may thus be configured to communicate via wired or wireless communications with other processors, where such one or more processor may be configured to operate on one or more processor-controlled devices that may be similar or different devices. Use of such "microprocessor" or "processor" terminology may thus also be understood to include a central processing unit, an arithmetic logic unit, an application-specific integrated circuit (IC), and/or a task engine, with such examples provided for illustration and not limitation.

Furthermore, references to memory, unless otherwise specified, may include one or more processor-readable and accessible memory elements and/or components that may be internal to the processor-controlled device, external to the processor-controlled device, and/or may be accessed via a wired or wireless network using a variety of communications protocols, and unless otherwise specified, may be arranged to include a combination of external and internal memory devices, where such memory may be contiguous and/or partitioned based on the application. Accordingly, references to a database may be understood to include one or more memory associations, where such references may include commercially available database products (e.g., SQL, Informix, Oracle) and also proprietary databases, and may also include other structures for associating memory such as links, queues, graphs, trees, with such structures provided for illustration and not limitation.

References to a network, unless provided otherwise, may include one or more intranets and/or the internet. References herein to microprocessor instructions or microprocessor-executable instructions, in accordance with the above, may be understood to include programmable hardware.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems.

Throughout the entirety of the present disclosure, use of the articles "a" and/or an and/or the to modify a noun may be understood to be used for convenience and to include one, or more than one, of the modified noun, unless otherwise specifically stated. The terms "comprising", "including" and "having" are intended to be inclusive and mean that there may be additional elements other than the listed elements.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Although the methods and systems have been described relative to a specific embodiment thereof, they are not so limited. Obviously many modifications and variations may become apparent in light of the above teachings. Many additional changes in the details, materials, and arrangement of parts, herein described and illustrated, may be made by those skilled in the art.

What is claimed is:

1. A no-load detection and shutdown circuit, comprising:
   a circuit having an input capable of being placed in mechanical and electrical communication with a primary side of a driver and an output capable of being placed in mechanical and electrical communication with a half-bridge inverter of the driver, wherein the circuit is configured to detect a no load condition at an output of the driver, and in response, to provide a signal at the output to shut down the driver.

2. The no-load detection and shutdown circuit of claim 1, wherein the circuit comprises:
   a first capacitor having a first lead connected to the input;
   a second capacitor having a first lead connected to a second lead of the first capacitor and a second lead connected to a ground;
   a first Zener diode having an anode connected to the first lead of the second capacitor and to a second lead of the first capacitor, the first Zener diode having a cathode;
   a second Zener diode having a cathode connected to the cathode of the first Zener diode, the second Zener diode having an anode;
   a first resistor having a first lead connected to the anode of the second Zener diode;
   a second resistor having a first lead connected to the anode of the second Zener diode and connected to the first lead of the first resistor, the second resistor having a second lead connected to the ground; and a third Zener diode having an anode connected to the second lead of the first resistor, the second Zener diode having a cathode connected to the output of the circuit.

3. The no-load detection and shutdown circuit of claim 2, wherein a no-load condition results in an increased voltage at the first capacitor and the second capacitor;

wherein the increased voltage at the first and second capacitor breaks down the first Zener diode and the second Zener diode; and wherein an increased voltage at the second Zener diode causes the third Zener diode to breakdown and provides a signal at the output of the no-load detection and shutdown circuit indicating a no-load condition has occurred, the signal at the output of the no-load detection and shutdown circuit causing the driver to shutdown.

4. The no-load detection and shutdown circuit of claim 1, wherein the circuit is configured to detect a no load condition at an output of the driver, and in response, the driver is configured to generate a driver output voltage greater than a predetermined voltage.

5. The no-load detection and shutdown circuit of claim 4, wherein the predetermined voltage is sixty volts.

6. An apparatus comprising:
a driver having an input configured to receive an alternating current (AC) voltage and an output configured to provide a direct current (DC) voltage to drive a load; and
a no load detection circuit coupled to the driver, wherein the no load detection circuit is configured to detect a no load condition at the output of the driver and, in response, is configured to provide a signal to the driver causing the driver to shut down.

7. The apparatus of claim 6, wherein the driver comprises:
an EMI front end coupled to a first AC line, a second AC line, and a neutral line, the EMI front end configured to provide a rectified DC voltage;
a boost PFC circuit coupled to the EMI front end, the boost PFC configured to provide a boosted voltage;
an inverter coupled to the boost PFC circuit;
an HB driver coupled to the inverter;
an isolation transformer having a primary side coupled to the inverter and a secondary side;
a rectifier coupled to the secondary side of the isolation transformer; and
an output filter coupled to the rectifier, an output of the output filter capable of driving a load.

8. The apparatus of claim 7, wherein the no load detection circuit comprises:
an input comprising a first capacitor having a first lead connected to the primary side of the isolation transformer;
a second capacitor having a first lead connected to a second lead of the first capacitor and a second lead connected to a ground;
a first Zener diode having an anode connected to the first lead of the second capacitor and connected to a second lead of the first capacitor, the first Zener diode having a cathode;
a second Zener diode having a cathode connected to the cathode of the first Zener diode, the second Zener diode having an anode;
a first resistor having a first lead connected to the anode of the second Zener diode;

a second resistor having a first lead connected to the anode of the second Zener diode and connected to the first lead of the first resistor, the second resistor having a second lead connected to the ground; and a third Zener diode having an anode connected to the second lead of the first resistor, wherein the second Zener diode has a cathode connected to the HB driver.

9. The apparatus of claim 8, wherein a no-load condition is reflected on the isolation transformer and to the no load detection circuit, wherein the no load detection circuit is configured to provide an output indicating the no load condition, wherein the HB driver is configured to receive the output indicating the no load condition and in response, is configured to shut down the driver.

10. The apparatus of claim 6, wherein the no-load detection circuit is configured to detect a no load condition at the output of the driver and, in response, the driver is configured to output a driver voltage greater than a predetermined voltage.

11. The apparatus of claim 10, wherein a driver voltage greater than a predetermined voltage comprises a driver voltage greater than sixty volts.

12. The apparatus of claim 8, wherein a no-load condition results in an increased voltage at the first capacitor and the second capacitor, wherein the increased voltage at the first and second capacitor breaks down the first Zener diode and the second Zener diode, and wherein an increased voltage at the second Zener diode causes the third Zener diode to breakdown and provides a signal at the output of the no-load detection circuit indicating a no-load condition has occurred, the signal at the output of the no-load detection circuit causing the driver to shutdown.

13. A method comprising:
detecting a no-load condition on an output of a driver;
in response, generating a shutdown signal by a no load detection circuit;
providing the shutdown signal to the driver; and
in response, shutting down the driver.

14. The method of claim 13, wherein detecting a no-load condition comprises detecting a driver output voltage greater than a predetermined voltage.

15. The method of claim 14, wherein detecting a driver output voltage comprises detecting a driver output voltage greater than sixty volts.

16. The method of claim 15, wherein providing the shutdown signal to the driver comprises providing a signal to an HB driver of the driver, which results in half bridge inverter oscillations being stopped.

17. The method of claim 13, wherein generating a shutdown signal comprises:
receiving an increased voltage at an input of the no load detection circuit; and
determining the increased voltage is large enough to shut down the driver.

18. A no-load detection and shutdown circuit for a solid state light source driver apparatus having a half-bridge inverter connected to an HB driver and having an isolation transformer, comprising:
an input connected to a primary side of an isolation transformer;
an output connected to the HB driver; and
a circuit between the input and the output, being configured to detect a no load condition at an output of the solid state light source driver apparatus, and in response, to provide a signal to shut down the solid state light source driver apparatus.

19. An apparatus comprising:
- a solid state light source driver apparatus having an input configured to receive an alternating current (AC) voltage and an output configured to provide a direct current (DC) voltage to drive a load;
- a half-bridge inverter connected to an HB driver;
- an isolation transformer; and
- a no load detection and shutdown circuit coupled to the solid state light source driver apparatus, wherein the no load detection and shutdown circuit is configured to detect a no load condition at the output of the solid state light source driver apparatus and, in response, is configured to provide a signal to the solid state light source driver apparatus causing the solid state light source driver apparatus to shut down.

20. A method of detecting a no-load condition at an output of a solid state light source driver apparatus, having a half-bridge inverter connected to an HB driver and having an isolation transformer, and of shutting down the solid state light source driver apparatus, the method comprising:
- detecting a no-load condition on an output of the solid state light source driver apparatus as an increased voltage at a primary winding of the isolation transformer;
- in response, generating a shutdown signal by a no load detection and shutdown circuit;
- providing the shutdown signal to the HB driver; and
- in response, shutting down the solid state light source driver apparatus.

* * * * *